United States Patent [19]

Draugelis et al.

[11] E Re. 28,802

[45] Reissued May 4, 1976

[54] FUSING APPARATUS

[75] Inventors: Vaidevutis C. Draugelis; George N. Tsilibes; John E. Vineski, all of Rochester, N.Y.

[73] Assignee: Xerox Corporation, Stamford, Conn.

[22] Filed: Oct. 3, 1974

[21] Appl. No.: 511,880

Related U.S. Patent Documents

Reissue of:

[64] Patent No.: 3,826,892
Issued: July 30, 1974
Appl. No.: 300,531
Filed: Oct. 25, 1972

[52] U.S. Cl. ..... 219/216; 219/388
[51] Int. Cl.[2] ..... H05B 1/00
[58] Field of Search ..... 219/216, 388; 355/9; 432/59, 227, 230; 250/317–319

[56] References Cited

UNITED STATES PATENTS

| | | | |
|---|---|---|---|
| 3,145,637 | 8/1964 | Frantz | 34/162 X |
| 3,398,259 | 8/1968 | Trebay et al. | 219/216 |
| 3,444,354 | 5/1969 | Mindell | 219/216 |
| 3,498,592 | 3/1970 | Moser et al. | 219/388 X |
| 3,517,164 | 6/1970 | Huggins et al. | 219/216 X |
| 3,584,195 | 6/1971 | Vince | 219/216 X |
| 3,642,365 | 2/1972 | Egnaczak | 355/8 |
| 3,649,808 | 3/1972 | Garbie | 219/216 |
| 3,697,722 | 10/1972 | Furuichi | 219/216 |
| 3,697,726 | 10/1972 | Geronime | 219/216 |
| 3,748,088 | 7/1973 | Mooney | 219/216 X |

*Primary Examiner*—C. L. Albritton
*Attorney, Agent, or Firm*—H. Fleischer; J. J. Ralabate; C. A. Green

[57] ABSTRACT

An apparatus in which a powder pattern deposited on a support material is permanently affixed thereto. The support material is heated during the movement thereof into thermal communication with a radiant energy output. In this manner, the powder pattern is coalesced and fixed permanently to the support material.

[ The foregoing abstract is neither intended to define the invention disclosed in the specification, nor is it intended to be limiting as to the scope of the invention in any way. ]

10 Claims, 6 Drawing Figures

FUSING APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to an electrophotographic printing machine, and more particularly concerns an apparatus for coalescing and affixing permanently a powder pattern to a support material in image configuration.

In the process of electrophotographic printing, a charged photoconductive member is exposed to a light image of an original document to be reproduced for recording thereon an electrostatic latent image. A development system, thereupon, moves a developer mix of carrier granules and toner particles, into contact with the photoconductive member. Toner particles are attracted electrostatically to the latent image forming a toner powder image thereon. The toner powder image is, then, transferred to the sheet of support material.

Multi-color printing repeats the foregoing process a plurality of cycles. Each development cycle deposits differently colored toner particles on the support material, in superimposed registration with the previously deposited toner particles. Hence, the support material will have transferred thereto various layers of toner particles forming a multi-layered powder image. The powdered layers have to coalesce and become transparent, i.e. each toner layer modulates the light rays passing therethrough, to form a copy having a single composite color. In this manner, the modulated light rays transmitted through the toner powder layers are reflected from the support material back through the toner powder to the eye of the observer. If the toner layers do not become transparent, the color reproduced will merely be that of the uppermost layer of toner particles. It is apparent that the fusing operation must coalesce the toner particles and form transparent layers thereof to appropriately modulate the light rays transmitted therethrough creating a copy having the composite color of the original document.

Generally, the toner particles include, primarily, fusible resins. When such toner particles are transferred to the support material, the powder image can be permanently affixed thereto by heating which partially dissolves the toner particles causing them to fuse into the support material. Conventional black and white electrophotographic printing machines utilize fusers which heat the toner particles sufficiently to fix them to the support material, while not charring or igniting the support material. Heretofore, there was little concern with coalescing multi-layers of toner particles. Thus, it is apparent that the requirement for coalescing multi-layers of toner particles adds but one more variable in an already complex system.

Preferably, it is desirable to raise the temperature of the support material so that it is close to the fusing temperature of the toner particles. In this way, the support material acts as a heat source rather than a heat sink during the fusing operation. Thus, a suitable fusing apparatus may include heating the support material as well as applying radiant heat thereto to permanently affix and coalesce the toner powder image to the support material.

Heating of the support material prior to exposing the toner powder image to radiant energy has been disclosed in U.S. Pat. No. 3,187,162 issued to Toku Hojo et al. in 1965. As disclosed therein, the support material advances over a pre-heat platen which raises the temperature thereof by conduction. The fuser disclosed in the Hojo patent also includes an incandescent filament lamp arranged adjacent to and over the path of travel of the support material to emit radiant energy which assists in fusing the toner powder image to the support material.

In high speed electrophotographic printing machines, the utilization of a stationary pre-heat platen may pose a problem. A boundary layer of air frequently is developed between the rapidly moving support material and the pre-heat platen. This layer of air serves to insulate the support material from the pre-heat platen and introduces a variable in the actual temperature of the support material. The more rapidly the support material is moved over the platen, the greater the uncertainty in heating the support material to a predetermined temperature. This is particularly significant when the support material is cut sheet paper, such as is used in conventional electrophotographic printing machines, rather than a web of paper passing over the pre-heat platen. The rapid movement of a relatively non-rigid sheet forces air between the heated platen and the sheet. Hence, the more rapidly the cut sheet of paper moves over the heated platen, the greater will be the boundary layer created thereby. In addition thereto, the radiant heater and the pre-heat platen must operate in conjunction with one another to coalesce and affix the multi-layer toner powder image to the support material. This should be achieved without charring or igniting the support material. Precise temperature control of the support material is not readily attainable when a sheet of cut paper passes over a stationary platen forming a layer of air therebetween.

Accordingly, it is a primary object of the present invention to improve the fusing of single or multi-layered toner powder images to create a composite colored reproduction corresponding to the original colored document.

SUMMARY OF THE INVENTION

Briefly stated, and in accordance with the present invention, there is provided an apparatus for coalescing and affixing permanently a powder pattern to a support material.

In the preferred embodiment thereof, the apparatus includes transport means, heating means, and a radiant energy source. The transport means advances a sheet of support material with a powder pattern deposited on one surface thereof along a path of movement, the other surface of the support material being in substantial contact with the transport means. As the support material is advanced, heating means heat the transport means, which, in turn , heats the support material. Additional energy is supplied by the radiant energy source, the radiant energy source being in thermal communication with the support material advancing along the path of movement thereof.

BRIEF DESCRIPTION OF THE DRAWINGS

Other objects and advantages of the present invention will become apparent upon reading the following etailed description and upon reference to the drawıgs, in which.

Figure 1:
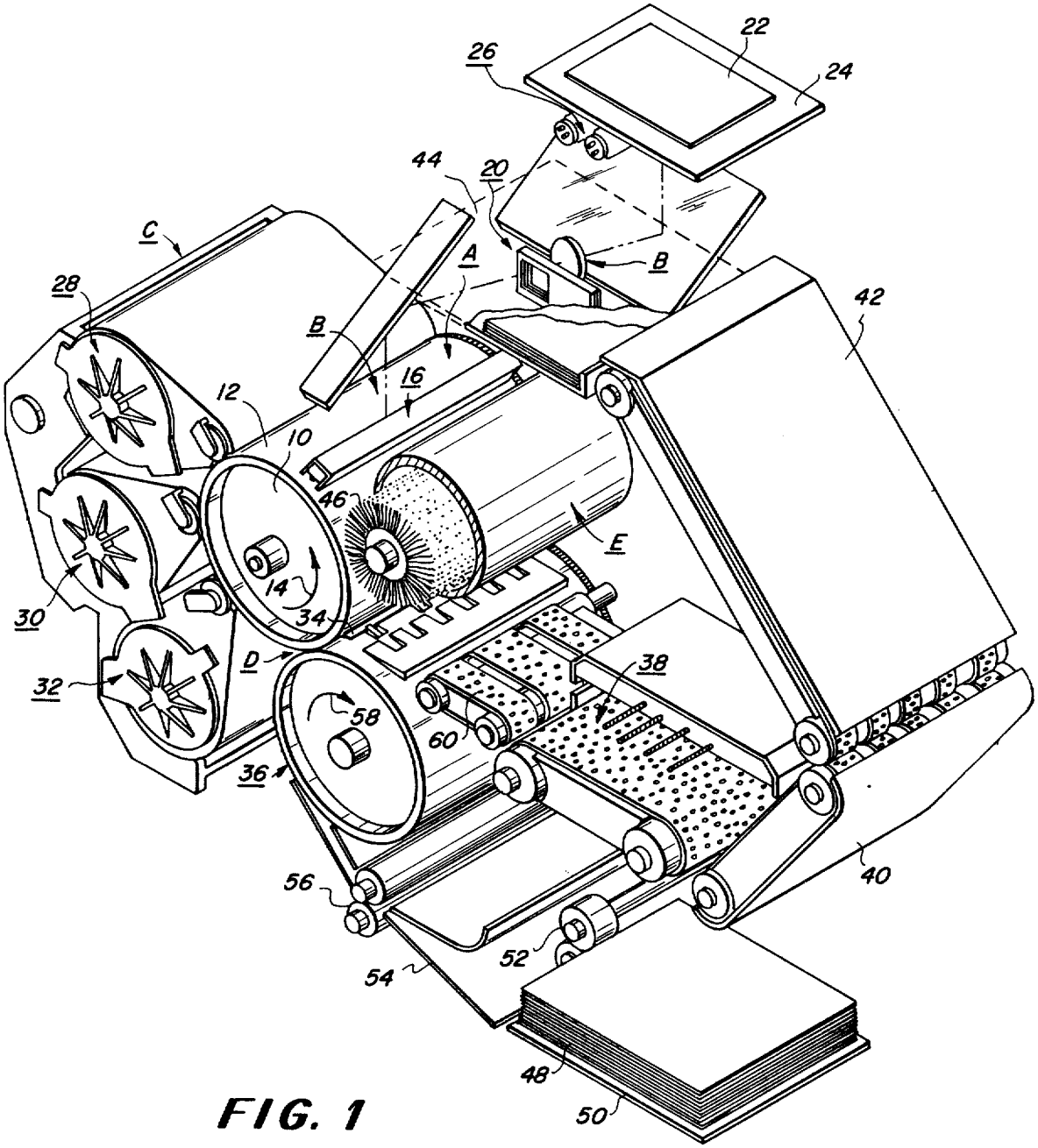
FIG. 1 is a schematic perspective view of an electrohotographic printing machine having the present inention therein.

W.ıile the present invention will be described in conection with the preferred embodiment and method of se thereof, it will be understood that it is not intended ɔ limit the invention to that embodiment or method of se. On the contrary, it is intended to cover all alternaives, modifications and equivalents as may be included vithin the spirit and scope of the invention as defined ɔy the appended claims.

DETAILED DESCRIPTION OF INVENTION

In an electrophotographic printing machine, very ittle time is available in which to coalesce and affix ɔermanently a multi-layered powder image to a support naterial. The heat transfer must be rapidly and effiiiently accomplished to obtain complete coalescence. Radiant heat transfer, in which infrared energy is emited from a high temperature source, is an efficient ıource of energy which can be readily transferred to a ıupport material having a multi-layered toner powder mage deposited thereon.

An efficient radiator of infrared energy converts a ıigh percentage of the internal energy available to radiant heat, and will concentrate this energy in a band of wavelengths located at the short end of the infrared spectrum. The support material is generally paper which absorbs a high percentage of infrared energy at wavelengths greater than 3.0 microns. At shorter wavelengths, the infrared energy absorption of the paper decreases rapidly. Infrared energy incident upon the toner powder image is rapidly converted to internal energy. However, if the temperature of the support material is lower than that of the toner powder image, the support material will act as a heat sink dissipating heat from the image areas. The heat energy transferred conductively from the toner powder image to the support material is dependent upon the temperature gradient therebetween. The magnitude of this heat transfer is critical, and may prevent the coalescence of the multi-layered toner powder image utilized in color electrophotographic printing. It, therefore, appears to be desirable to heat the support material minimizing any heat loss thereto. In the present invention, the support material is heated, in conjunction with, radiant energy being supplied thereto to coalesce the toner powder image. This will be explained in greater detail with reference to the drawings wherein like reference numerals have been used throughout to designate like elements.

Turning now to the drawings, FIG. 1 schematically illustrates an electrophotographic printing machine arranged to produce multi-color copies from a color original. As shown therein the machine employs a photoconductive member having a rotatably mounted drum 10 with a photoconductive surface 12 thereon. Drum 10 rotates in the direction indicated by arrow 14 to move photoconductive surface 12 through a series of processing stations A through E, inclusive.

Initially, drum 10 rotates photoconductive surface 12 through charging station A which has a corona generating device, indicated generally by the reference numeral 16, positioned thereat. Preferably, corona generating device 16 extends transversely across photoconductive surface 12 and is arranged to charge surface 12 to a relatively high uniform potential. A suitable corona generating device is described in U.S. Pat. No. 2,778,946 issued to Mayo in 1957.

Charged photoconductive surface 12 next rotates to exposure station B wherein a moving lens system, indicated generally at 18, and a color filter mechanism, depicted generally at 20, are positioned. One type of moving lens system suitable for the electrophotographic printing machine of FIG. 1 is disclosed in U.S. Pat. No. 2,062,108 issued to Mayo in 1962. As illustrated in FIG. 1, a colored original document 22 is stationarily supported face down upon transparent viewing platen 24. In this manner, successive incremental areas of original document 22 are illuminated by a moving lamp assembly, indicated generally at 26. Lamp assembly 26 and lens system 18 are moved in a timed relation with drum 10 to produce a flowing light image of original document 22 on photoconductive surface 12. The resultant image produced on photoconductive surface 12 is termed an electrostatic latent image. The electrophotographic printing machine depicted in FIG. 1 is arranged to interpose selected colored filters in the optical path of lens 18 via filter mechanism 20. Preferably, filter mechanism 20 operates on the light rays transmitted through lens 18 to record an electrostatic latent image on photoconductive surface 12 corresponding to a preselected spectral region of the electromagnetic wave spectrum, i.e. a color separated electrostatic latent image. In this manner, an electrostatic latent image is produced on photoconductive surface 12 which corresponds to a single color of original document 22.

Subsequent to the recording of the color separated electrostatic latent image on photoconductive surface 12, drum 10 rotates to development station C having three individual developer units, generally indicated by the reference numerals 28, 30 and 32, respectively, located thereat. The developer units depicted in FIG. 1 are all magnetic brush type developer units. In a magnetic brush development system, a magnetizable developer mix having carrier granules and toner particles is continually brought through a directional flux field to form a brush of developer mix. A suitable development system utilizing a plurality of developer units is disclosed in copending application Ser. No. 255,259 filed in 1972. Development is achieved by contacting photoconductive surface 12 with the brush of developer mix. Developer units 28, 30 and 32, each apply toner particles corresponding to the complement of the color separated latent image recorded on photoconductive surface 12. For example, developer units 28 deposits cyan toner particles on a red filtered latent image, developer unit 30 deposits magenta toner particles on a green filtered latent image, and developer unit 32 deposits yellow toner particles on a blue filtered latent image. The aforementioned steps of depositing various color toner particles on the respective electrostatic latent images occurs sequentially rather than simultaneously.

After development, the toner powder image electrostatically adheres to photoconductive surface 12 and moves therewith to transfer station D. At transfer station D the powder image is transferred to a sheet of final support material 34 by means of a biased transfer roll, shown generally at 36. U.S. Pat. No. 3,612,677 issued to Langdon in 1972 discloses a suitable electrically biased transfer roll. Transfer roll 36 is biased electrically to a potential such that the magnitude and polarity thereof is sufficient to attract electrostatically the toner powder image from photoconductive surface 12 to support material 34. A single sheet of support material 34 is supported on transfer roll 36. Bias transfer roll 36 is arranged to recirculate the sheet of support material 34 in synchronism with the rotation of drum 10. In this manner, the toner powder images developed on photoconductive surface 12 are transferred, in superimposed registration, to sheet 34. Hence, it is apparent that in a multi-color electrophotographic printing of the type depicted in FIG. 1, the aforementioned steps of charging, exposing, developing and transfer are repeated for a plurality of color separated light images in order to form a composite picture of the original document corresponding in color thereto.

After the last transfer operation, support sheet 34 is stripped from bias transfer roll 36. Conveyor 60 advances sheet 34 to a fuser, shown generally at 38, where the multi-layered toner powder image is coalesced and permanently affixed thereto. Fuser 38 will be discussed hereinafter in conjunction with FIGS. 2 through 6, inclusive, in greater detail. After the multi-layered toner powder image is coalesced to support material 34, endless conveyor belts 40 and 42 advance support material 34 to catch tray 44 for subsequent removal by the machine operator.

Cleaning station E is the last processing station in the direction of rotation of drum 10, as indicated by arrow 14. Cleaning station E has positioned thereat a rotatably mounted fibrous brush 46 which engages photoconductive surface 12 to remove residual toner particles remaining thereon after the transfer operation. Preferably, fibrous brush 46 is of the type described in U.S. Pat. No. 3,590,412 issued to Gerbasi in 1971.

It should be noted that support material 34 may be plain paper or a transparent thermoplastic sheet, amongst others, which is advanced from a stack 48 mounted on tray 50. Feed roll 52 separates and advances the uppermost sheet from stack 50 into a baffle arrangement 54. Baffle 54 guides the advancing sheet into the nip of a pair of register rolls which align the sheet and pass it therebetween such that it is releasably secured to bias transfer roll 36. Bias transfer roll 36 is arranged to rotate in the direction of arrow 58 moving support material 34, releasably secured thereto, in a recirculating path such that successive toner images are transferred thereto in superimposed registration with one another forming a multi-layered toner powder image.

Figure 2:
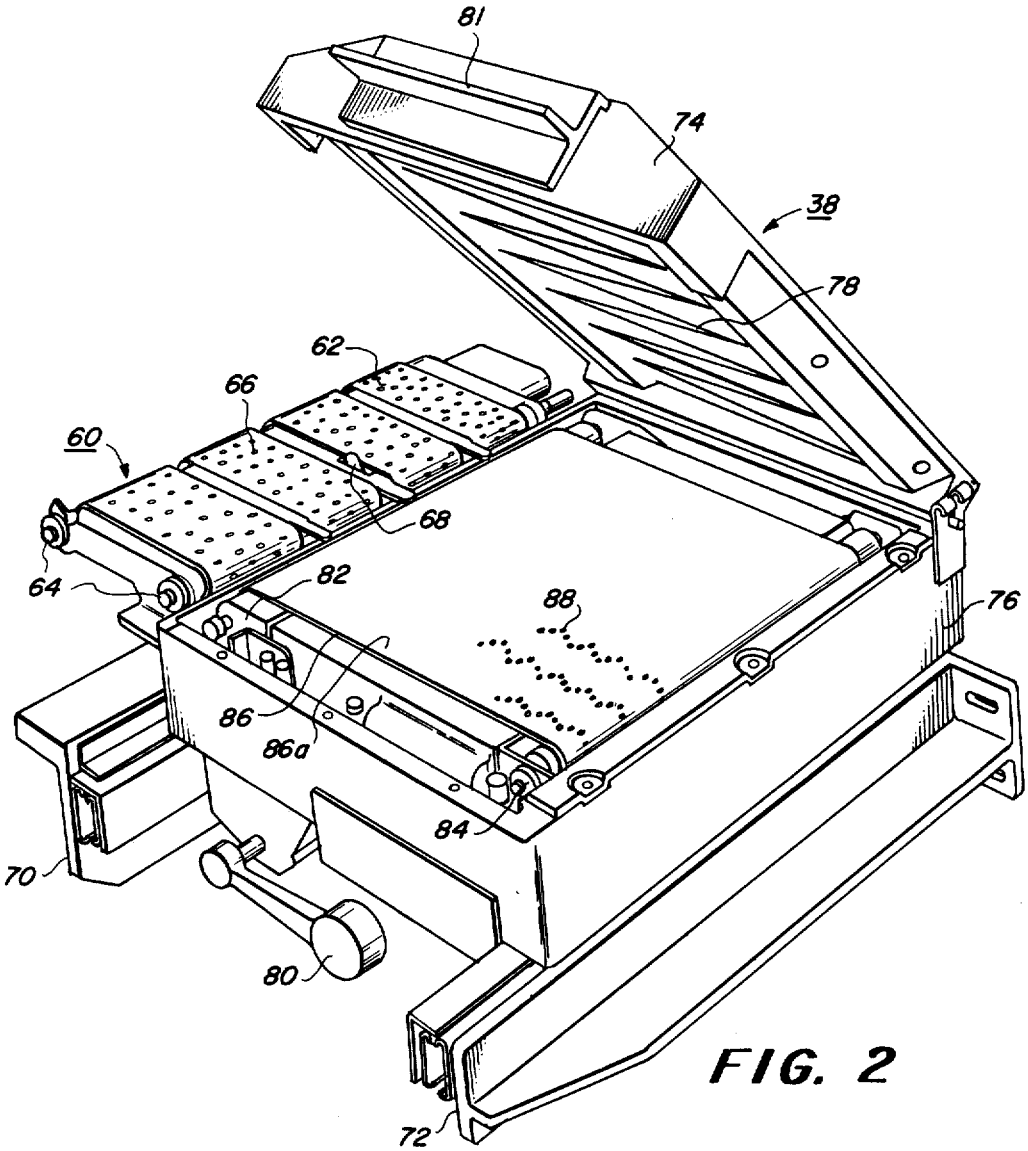
FIG. 2 is a perspective view of the fuser incorporated ı the FIG. 1 printing machine with the cover pivoted ) the opened position.

Referring now to FIG. 2, there is shown a perspective view of the fuser utilized in the electrophotographic printing machine of FIG. 1. The fuser is depicted in FIG. 2 as having the cover pivoted to an open position. Conveyor 60 is associated with the fuser to transport support material 34 from transfer roll 36 thereto. Conveyor 60 comprises a plurality of endless belts 62 entrained about a pair of opposed, spaced rollers 64. A vacuum system maintains a low pressure by drawing a through apertures 66 in belt 62 to tack support materi 34 thereto. Leaf switch 68 detects the presence c support material 34 on belt 62 and indicates that sup port material 34 has been stripped properly from bi roll 36 without causing a machine jam. A suitable tim ing disc (not shown), mounted on drum 10 and adapte to rotate, therewith cooperates with the machine logi to actuate fuser 38 when sheet 34 passes therein. Fuse 38 is mounted slidably in the electrophotographi printing machine, i.e. it is mounted on a pair of space slides 70 and 82 affixed to the frame of the machine This permits the removal of the fuser and the repair o replacement thereof.

As depicted in FIG. 2, fuser 38 includes a cove member 74 pivoted to the opening position to sho more clearly lower housing member 76. Cover membe 74 includes radiant energy source 78 which will b described in greater detail with reference to FIG. 4 Handle 81 is adapted to pivot cover 74 from the ope position, as shown in FIG. 2, to the closed position o FIG. 3. Latch 80 disengages fuser 38 from the printin machine frame permitting the removal thereof alon slides 70 and [82] *72.* Lower housing member 7 defines an open ended chamber having a pair of space rollers 82 and 84 mounted rotatably on transport fram 109 (FIG. 5) disposed therein. An endless belt 86 i entrained about rollers 82 and 84. Endless belt 86 in cludes a plurality of apertures 88 therein which ar arranged to draw air therethrough such that suppor material 34 is tacked thereto as it passes through fuse 38. Preferably, endless belt 86 is made from an elasto meric material such as silicone rubber. However, an flexible material having high thermal resistance may b suitable.

Figure 3:
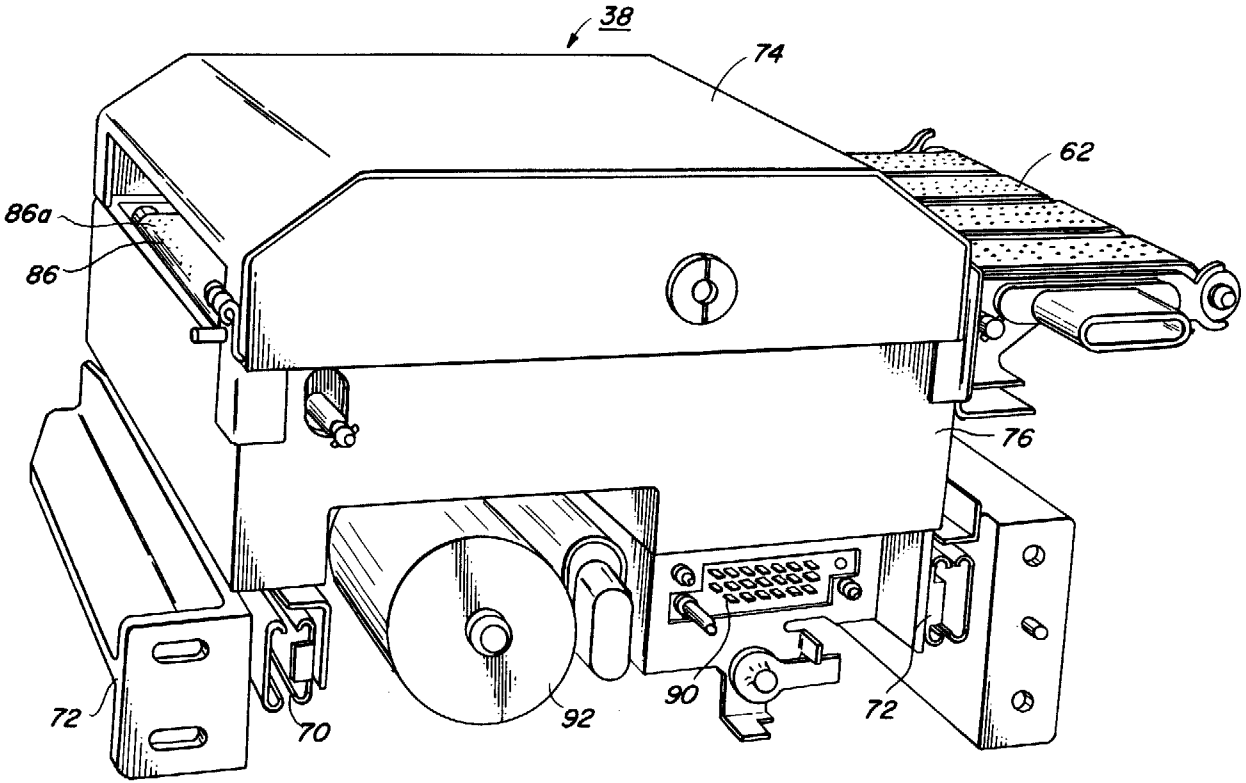
FIG. 3 is a perspective view of the FIG. 2 fuser.

Referring now to FIG. 3, there is shown fuser 38 witl cover member 74 in the closed position. As illustrate therein, cover member 74 is pivoted in the closed posi tion. When closed, cover member 74 in conjunctio with lower housing member 76, defines a passage wa through fuser 38 permitting endless belts 62 and 86 t move support material 34 therethrough. Fuser 38 in cludes a male connector 90 adapted to mate with a female connector (not shown) mounted on the fram of the printing machine. This enables fuser 38 t readily be removed from the machine and re-installe therein without connecting electrical wires, i.e. fuse 38 moves along slides 72 and [74] *70* until connec tor 90 mates with the female connector mounted on th machine frame. This electrically connects the fuser t the power supply placing it in an operable mode. Ai removing means or blower motor 92 is operativel associated with fuser 38 to maintain a suitable pressur differential tacking support material 34 to the exterio surface 86a of endless belt 86. In addition thereto, th air passing through endless belt 86 is heated. The heat ing means will be described hereinafter in conjunctio with FIGS. 5 and 6. Preferably, blower motor 92 is a two-pole split-capacitor motor.

Figure 4:
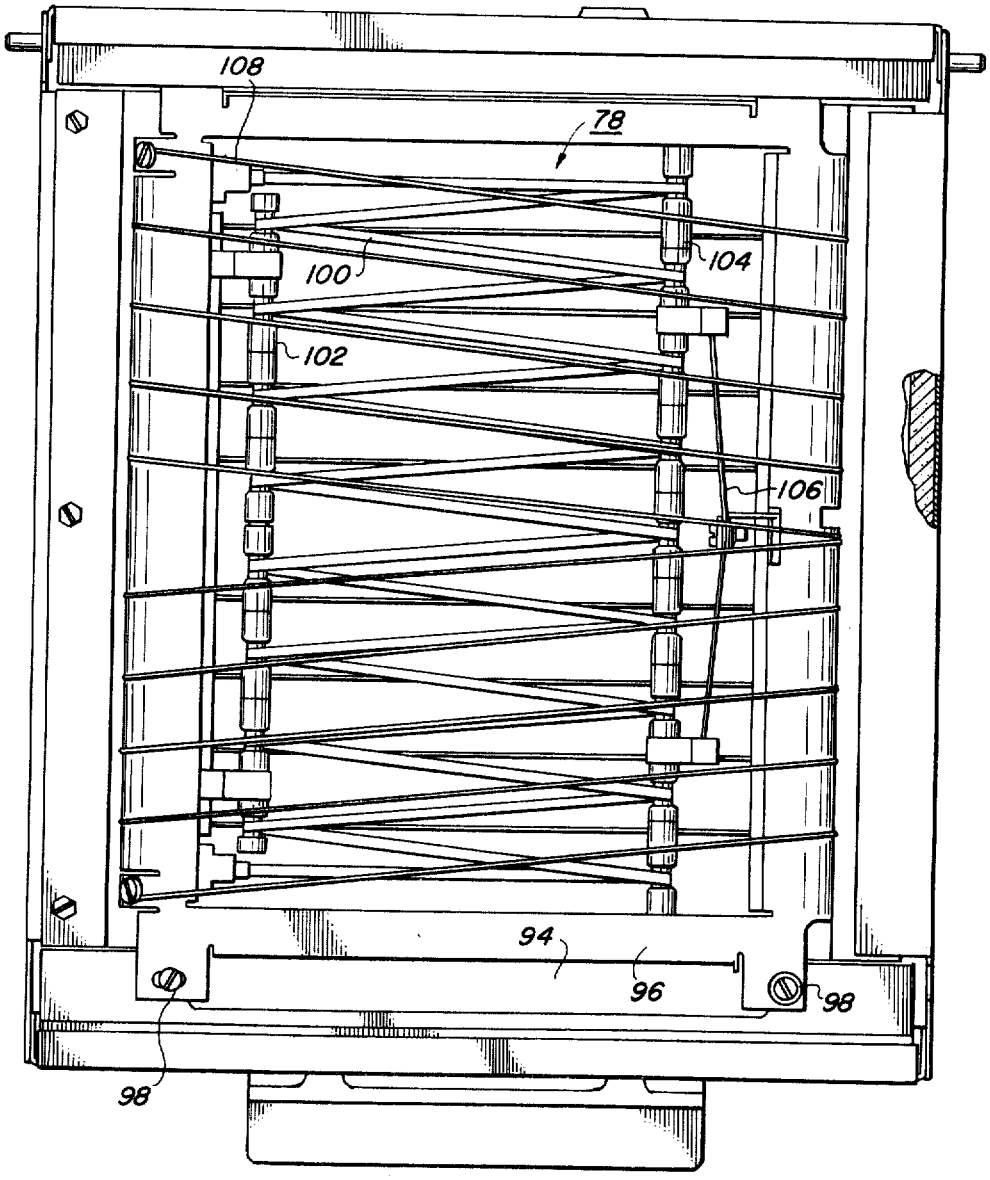
FIG. 4 is a plan view of the cover utilized in the FIG. fuser.

Turning now to FIG. 4, there is shown a planar vie of cover member 74. Preferably, cover member 7 includes a metal shell having secured to the interio surface thereof suitable insulation. A silicon rubbe coating is sprayed on the exterior surface of cover 74 t protect the operator. An outer reflector 94 is suitabl secured to the insulation. An inner reflector 96 i mounted to the outer reflector via a pair of screws 98 Both reflectors 94 and 96, preferably, are made fro minum having a reflectivity of approximately 95 cent. Air circulates between inner reflector 96 and er reflector 94. Sensing means or a thermistor is itioned in the air space between inner reflector 96 l outer reflector 94 to measure the temperature reat. One type of suitable thermistor for detecting temperature in the air space between outer reflec- 94 and inner reflector 96 is a glass bead thermistor. 'he radiant energy source or radiant heat strip 78 is ickel chromium alloy ribbon 100 entrained helically ween a pair of spaced opposed support members h as ceramic spool assemblies 102 and 104, respec- ly. The arrangement of heat strips 78 is such as to vide substantially uniform radiation therefrom. at strips 78 are of a low thermal mass, preferably, ng made from a nickel chromium alloy, and having end elements thereof arranged to prevent radiation off. Ceramic spool 102 is mounted fixedly to cover Ceramic spool 104 is mounted to a leaf spring ar- gement 106 which, in turn, is mounted fixedly on er 74. Leaf spring 106 is made from a high tempera- e steel and is adapted to permit the distance between amic spools 104 and 102 to vary as a function of the rmal expansion of nickel chromium alloy ribbon ). A suitable guide, preferably wire 108, is wound r energy source 78 and arranged to prevent support terial 34 from engaging the heating elements or hrome ribbon 100. Guide 108 may be made from hrome wire, fiberglass string, or, preferably, from artz string.

Figure 5:
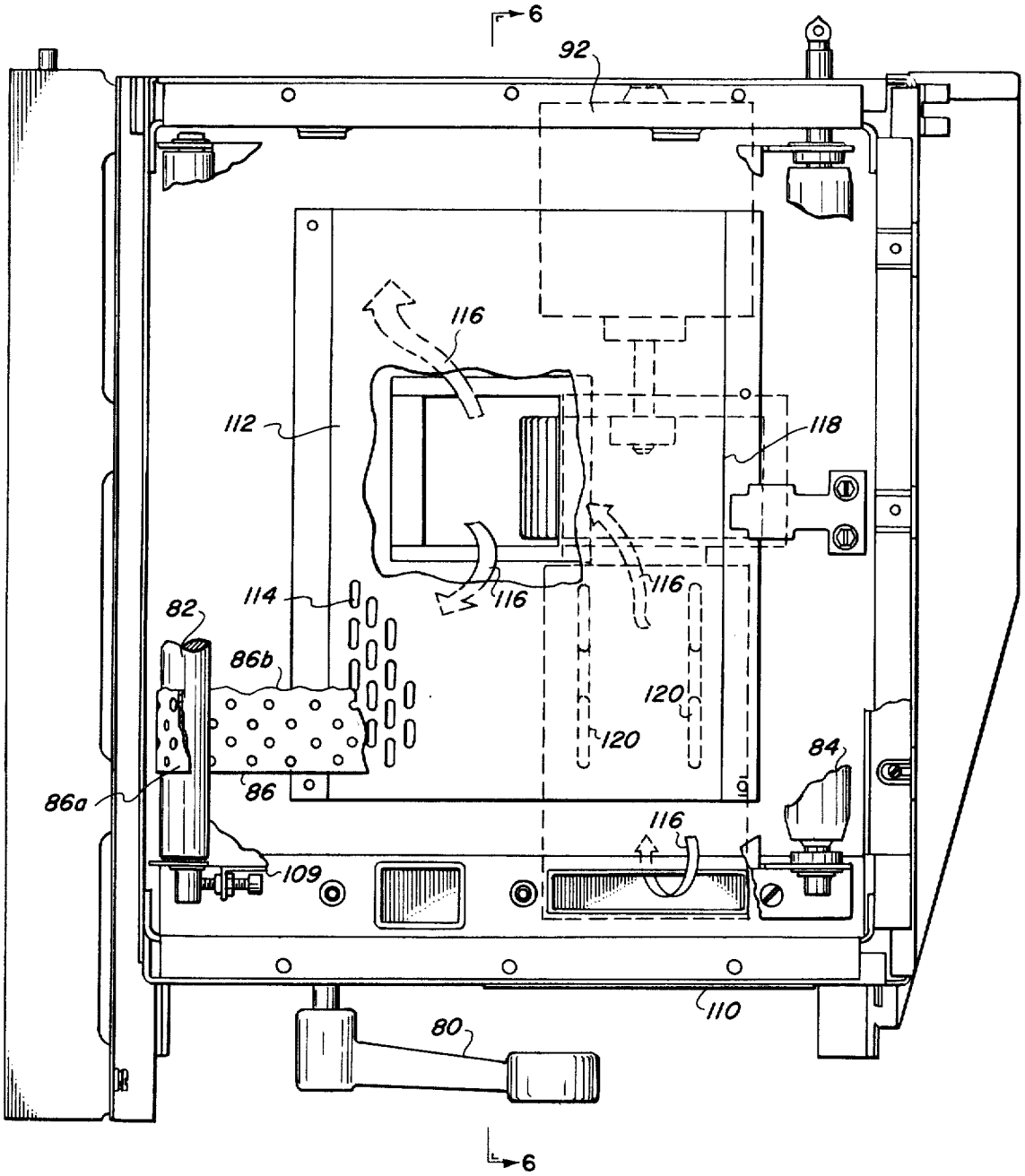
FIG. 5 is a plan view of the FIG. 2 fuser bottom housıg.

Turning now to FIG. 5, there is shown a plan view of ver housing assembly 76. Lower housing 76 includes heet metal shell 110 having insulation secured to the erior surface thereof. Transport frame 109 is unted removably in shell 110. Rollers 82 and 84 are atably mounted on frame 109 and have entrained reabout endless belt 86. Interior surface 86b of dless belt 86 is adapted to engage plate member 112. ate member 112 includes a plurality of apertures or ts 114 therein adapted to permit the flow of air rethrough in the direction of arrows 116. Blower mber 92 has vane member 118 mounted thereon d is adapted to rotate vane member 118 such that air ws in the direction of arrows 116. The air flow passes er heating means or auxiliary heater 120 onto plate mber 112 raising its temperature. Plate member 112 gages the undersurface 86b of endless belt 86 and nducts heat thereto. This, in turn, raises the tempera- re of support member 34 minimizing any heat loss reto. In this manner, radiant energy from elements 0, in conjunction with the heated support material coalesces the multi-layered toner powder image rmed thereon.

Figure 6:
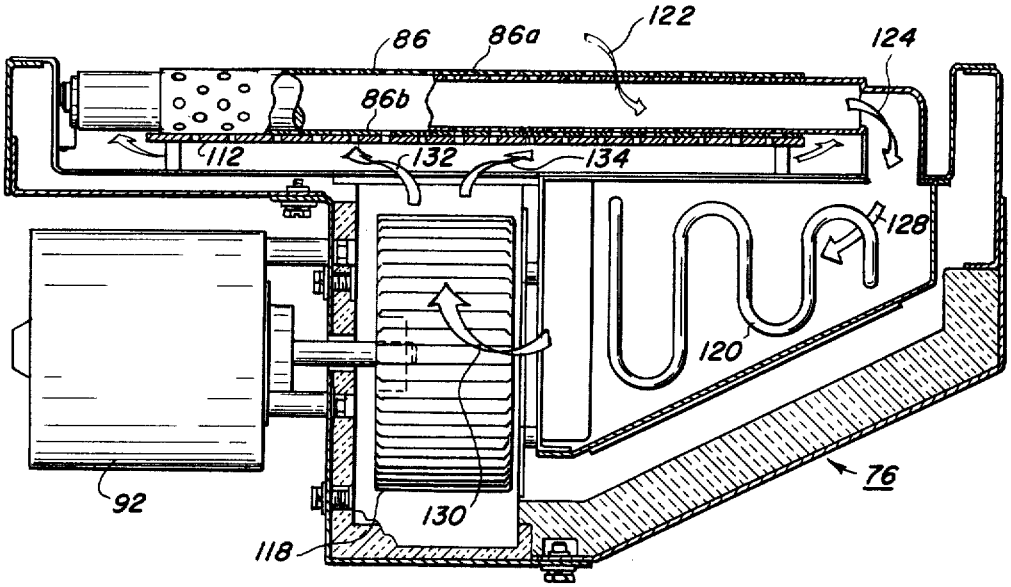
FIG. 6 is a sectional elevational view taken along the ne 6—6 of FIG. 5 in the direction of the arrows.

Referring now to FIG. 6, there is shown a sectional vational view of the air flow in lower housing 76. As own therein, air moves downwardly through the exte- or surface 86a of endless belt 86 in the direction of row 122. It passes through the opened ends of endless lt 86 as indicated by arrow 124 and over the resis- nce heating elements 126 of heating means 120 as dicated by arrow 128. It is drawn into vane member .8 as shown by arrow 130, and propelled therefrom, indicated by arrows 132 and 134, onto plate member .2 contacting interior surface 86b of endless belt 86. eating means 120 is, preferably, a 800 watt tubular gh mass heater. Sensing means of a cam enclosed ad thermistor (not shown) is arranged to detect the mperature of endless belt 86. The thermistor is mounted on a thermally conductive shoe which, in turn, is arranged to contact the lower surface 86b of belt 86.

The control means for heating means 120 is, preferably, a time proportional, zero cross-over controller whose function is to maintain the temperature of endless belt 86 at a prescribed standby temperature. Temperature control is achieved through thermistor feedback. The belt thermistor measures the actual temperature of belt 86 and suitable comparator circuits compare the sensed temperature with a reference corresponding to the desired standby temperature. The comparator circuits develop an error signal for actuating heating means 120. In this way, endless belt 86 is maintained at a desired standby temperature. The radiant energy source controller provides the control for radiant heat strip 78. It furnishes two distinct power levels, i.e. 1,750 watts and 1,250 watts, which are dependent upon the air temperature between outer reflector 94 and inner reflector 96. As mentioned previously, the thermistor positioned thereat detects the temperature in the air space therebetween. Preferably, the switch point is about 450° F. thus, if the thermistor positioned in the air space between inner and outer reflectors 96 and 94, respectively, indicates a temperature greater than 450° F switching means changes the power input to radiant strips 78 from about 1,750 watts to about 1,250 watts. If the thermistor indicates a temperature less than 450° F, the power input to radiant strips 78 switches from about 1,250 watts to about 1,750 watts. This is achieved by suitable comparator circuits which compare the measured temperature, as indicated by the thermistor in the air space therebetween, with a reference. The difference is an error signal which is utilized to control radiant strips 78. The foregoing type of control arrangement is utilized to maintain the total radiation impinging the powder image substantially constant. It is evident that as the temperature of both reflectors increases, the radiation emitted therefrom also increases. Thus, in order to maintain the total emitted radiation substantially constant, it is necessary to reduce the radiation emitted from heat strip 78. This is accomplished by reducing the power furnished to heat strip 78 from about 1,750 watts to about 1,250 watts.

In operation the electrophotographic printing machine is turned on and heated from a cold condition to a standby condition. During the warm up phase both heating means 120 and radiant energy source 78 are activated. Initially radiant energy source 78 operates a a full power of 1,750 watts. When endless belt 86 is raised to a preselected standby temperature which may range from about 390° F to about 420° F, depending upon humidity conditions, radiant energy source 78 is turned off. Fuser 38 is maintained at the standby temperature by heating means 120. When a sheet of support material enters the fuser the machine logic energizes radiant energy source 78 at the upper power level (in this case 1,750 watts), and de-energizes heater 120. As the sheet of support material leaves the fuser, the machine control logic energizes heater 120 and de-energizes radiant energy source 78. The preceding control scheme continues if the thermistor positioned in the air space between outer reflector 94 and inner reflector 96 indicates a temperature below about 450° F. If, however, the temperature exceeds about 450° F, radiant energy source 78 is energized at a lower power level (in this case 1,250 watts) when a sheet of support material enters the fuser. In addition thereto, heater 120 is energized substantially simultaneously with radiant energy source 78. As the sheet of support material leaves the fuser, the machine control logic de-energizes radiant energy source 78, while heater 120 remains energized. Furthermore, in the event that a transparency material such as a coated thermoplastic material rather than a paper is passing through the fuser, energy source 78 is inactivated and heating means 120 is activated. Thus, it is apparent that the aforementioned fuser and the associate control mechanism maintain the support material and the environment surrounding the multi-layered toner material at a sufficient temperature to coalesce the powder image without igniting or charring the support material. Therefore, it is apparent that the fusing apparatus of the present invention coalesce a multi-layered toner powder image creating a composite color reproduction corresponding to the original colored document.

In recapitulation, sequential color separated electrostatic latent images are formed on a photoconductive surface and sequentially developed by the respective colored toner particles complementing the color separated latent image. The developed toner powder image is transferred to a sheet of support material. This process is repeated a plurality of times forming a multi-layered (in this case a three layered) toner powder image wherein each layer of toner powder is of a distinctly different color from the prior layer. The layers of toner powder are coalesced in the fuser of the present invention forming a composite multi-color reproduction affixed to a support material.

Thus, it is apparent that there has been provided, in accordance with this invention, a fusing apparatus that fully satisfies the objects, aims and advantages set forth above. While the invention has been described in conjunction with a specific embodiment and method of use thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

[1. An electrophotographic printing machine of the type having a powder pattern formed on a sheet of support material, wherein the improvement includes:

means for transporting the sheet of support material with the powder pattern deposited on one surface thereof along a path of movement, said transport means being arranged to be in substantial contact with the other surface of the sheet of support material;

means for heating said transport means; and a radiant energy source having at least one heat strip arranged to be in thermal communication with the sheet of support material for supplying the energy output thereof onto the sheet of support material being moved with the powder pattern thereon by said transport means along the path of movement coalescing and affixing substantially permanently the powder pattern to the sheet of support material. ]

2. [ A printing machine as recited in claim 1, further including:]

*An electrophotographic printing machine of the type having a powder pattern formed on a sheet of support material, wherein the improvement includes:*

*means for transporting the sheet of support material with the powder image deposited on one surface thereof along a path of movement, said transport means being arranged to be in substantial contact with the other surface of the sheet of support material;*

*means for heating said transport means;*

*a radiant energy source having at least one heat strip arranged to be in thermal communication with the sheet of support material for supplying the energy output thereof onto the sheet of support material being moved with the powder pattern thereon by said transport means along the path of movement coalescing and affixing substantially permanently the powder pattern to the sheet of support material;* first control means arranged to actuate said heating means in response to the printing machine being energized for rapidly heating and regulating said transport means at about a standby temperature; and second control means arranged to actuate said radiant energy source, in response to the printing machine being energized, for rapidly heating said transport means to about the standby temperature; and deactuating said radiant energy source at about the standby temperature, said second control means, responsive to the sheet of support material being positioned on said transport means, for regulating said radiant energy source about a predetermined temperature at a lower power level and below the predetermined temperature at a higher power level.

3. A printing machine as recited in claim 2, wherein said second control means includes:

means for sensing the temperature in the region of said radiant energy source and generating an electrical output signal corresponding thereto;

means for developing a reference corresponding to the predetermined temperature;

means for comparing the electrical output signal with the reference to generate an electrical error signal indicative of the difference therebetween for regulating the power output from said radiant energy source; and means for switching said radiant energy source to the lower power level from the higher power level in response to the electrical error signal from said comparing means indicating said sensing means being above the predetermined temperature.

4. A printing machine as recited in claim 2, wherein said first control means includes:

means for sensing the temperature in the region of said transport means and generating an electrical output signal corresponding thereto;

means for developing a reference corresponding to the standby temperature; and means for comparing the reference with the electrical output signal and generating an electrical error signal indicative of the difference therebetween for regulating the power from said heating means.

5. A printing machine as recited in [1] *2* wherein said transport means includes:

a lower housing member defining an interior open ended chamber;

a frame member mounted removably in the chamber of said lower housing member;

a plurality of rollers mounted rotatably on said frame member, said rollers being positioned spaced from one another and having the axes of rotation thereof substantially parallel to one another;

an endless belt member having a plurality of apertures therein, said belt member being entrained about said rollers; and means for removing air from the chamber of said lower housing to secure releasably the sheet of support material to the exterior surface of said belt member.

6. A printing machine as recited in claim 5, wherein aid endless belt member preferably is made from a igh temperature elastomer.

7. A printing machine as recited in claim 5, wherein aid heating means includes:

a plate member having a plurality of apertures therein, said plate member being mounted in the open end of the chamber of said lower housing interposed between said rollers and substantially contacting the interior surface of said belt member; and at least one resistance heating element disposed in the chamber of said lower housing member, said heating element being positioned in the path of movement of the air being removed from the chamber heating the air which heats said belt member.

8. [A printing machine as recited in claim 5, herein said radiant energy source includes:] *An electrophotographic printing machine of the type having a owder pattern formed on a sheet of support material, herein the improvement includes:*

*a lower housing member defining an interior open-ended chamber;*

*a frame member mounted removably in the chamber of said lower housing member;*

*a plurality of rollers mounted rotatably on said frame member, said rollers being positioned spaced from*

*one another and having the axes of rotation thereof substantially parallel to one another;*

*an endless belt member having a plurality of apertures therein, said belt member being entrained about said rollers;*

*means for removing air from the chamber of said lower housing to secure releasably the sheet of support material to the exterior surface of said belt member;* a cover member mounted on said lower housing member and defining with said lower housing member a passage way enabling said endless belt member to move support material therethrough;

at least one radiant heat strip secured to said cover member, said heat strip being configured to furnish substantially uniform radiation across the surface of the sheet of support material; and reflecting means interposed between said cover member and said radiant strip directing the energy output therefrom onto the support material to coalesce and permanently affix the powder pattern thereto.

9. A printing machine as recited in claim 8, wherein said heat strip is preferably made from a helically wound ribbon of low thermal mass.

10. A printing machine as recited in claim 9, further including a pair of opposed spaced support members having said helical ribbon entrained thereabout, one of said support members being mounted substantially fixedly on said cover member and the other of said support members being mounted resiliently on said cover member to compensate for thermal expansion of said helical ribbon.

11. A printing machine as recited in claim 8 wherein said heat strip is preferably made from high temperature nickel chromium alloy.

* * * * *